3,364,040
MOLD WASH
George H. Criss, Pittsburgh, Pa., assignor to Harbison-Walker Refractories Company, Pittsburgh, Pa., a corporation of Pennsylvania
No Drawing. Filed Feb. 23, 1965, Ser. No. 434,675
4 Claims. (Cl. 106—38.23)

ABSTRACT OF THE DISCLOSURE

A sprayable mold wash comprising a nonplastic refractory aggregate, pulverized crude fire clay, and a fermented polysaccharide gum.

---

This invention relates to a wash for coating the interior surfaces of molds to be used in metallurgical casting. More particularly, this invention relates to a mold wash to be used for coating the interior walls of non-permeable molds by spraying. This invention does not relate to the gas forming type mold washes which form a gaseous layer between the mold wall and the casting.

The primary purpose of a mold wash or coating upon metallurgical molds is to prevent the casting, that is, the solidified metal shape formed by pouring molten metal into the mold, from sticking to the mold. Also, mold washes prevent erosion of the surface of the mold, thus extending mold life. Further, the cooling rate or the rate of heat loss from the casting can be controlled by the use of mold washes thus eliminating certain casting defects known in the art as "coring." Mold washes serve other purposes known to those familiar with the metal casting art.

The requirements for mold washes are several. Since a contemporary form of application of mold washes is spraying, a mold wash must be capable of being suspended in a slurry and forced through a spray nozzle without clogging the nozzle. It must not settle out of suspension or require constant agitation to keep in suspension. Furthermore, the mold must not gel to any appreciable extent, that is, it must not thicken and become stiff. Since a certain amount of gel is, however, required in all mold washes so the solids will remain in suspension, they are usually thixotropic, that is, when slightly agitated they are fluid.

The foregoing properties are required of a mold wash that is to be sprayed. Other necessary properties are: adherence to the mold walls especially when sprayed on surfaces around 450 to 500° F., chemically inactivity with respect to the mold wall and the casting, and resistance to spalling or cracking under rapid thermal change.

Prior mold washes have had various of the desired properties discussed above to some degree. The reactivity of many prior washes has given them a certain degree of instability: They have tended to irreversibly "set up" or gel when allowed to stand for any appreciable period of time. They have tended to have solid constituents settle out.

Generally, most mold washes are comprised of two components; namely, an aggregate and a suspending agent or binder. The aggregate is chosen so that the mold wash has the desired chemical and thermal shock resistant properties. The binder is chosen so that the mold wash has requisite suspending and adhering properties. Very common binders have been alkaline metal silicates.

It is, therefore, an object of this invention to provide a sprayable mold wash characterized by good stability over extended time periods, for example, over 8 hours.

It is another object of this invention to provide a mold wash of good thermal shock resistance, not wettable by normal casting metals, which easily is sprayed, and which is characterized by good adherence to mold walls, especially at elevated temperatures, for example, temperatures between 450 to 500° F.

The preferred embodiment of this invention, and the best mode now known for practicing it, is as follows. A calcined fireclay is crushed and sized to have the following screen analysis:

*Screen analysis (by weight)*

| | Percent |
|---|---|
| Held on 65 mesh | 5 |
| Pass 65 mesh held on 100 mesh | 10 |
| Pass 100 mesh held on 150 mesh | 10 |
| Pass 150 mesh held on 200 mesh | 10 |
| Pass 200 mesh held on 325 mesh | 10 |
| Pass 325 mesh | 55 |

The mold wash including the sized calcined fireclay is batched as follows:

*Batch*

| | Percent |
|---|---|
| Pulverized Crude Fireclay (−325 mesh) | 5 |
| Fermented Polysaccharide Gum | 0.1 |
| Sized Calcined Fireclay | By difference |

The milled or pulverized crude fireclay can be any plastic fireclay which has been pulverized, for example, in a hammer mill. By "crude" it is meant that the fireclay has not been calcined. Plastic clays are characterized by their great affinity for water and fine particle makeup. These properties promote the formation of colloids on addition of water which are responsible for the plastic and suspending properties of such clays.

The fermented polysaccharide is of the type formed by reacting or allowing the action of the bacteria *Xanthomonas campestris* on natural gums, for example, of the type disclosed in U.S. Patent 3,067,038 and sold under the trade name of "Kelzan" (of the Kelco Co., Clark, N.J.). These gums are known in the art as Xanthomonas hydrophilic colloids.

An exemplary chemical analysis (on an oxide basis) of the crude plastic fireclay and calcined fireclay used in the preferred embodiment are as follows:

| Chemical Analysis (percent) | Plastic Fireclay | Calcined Fireclay |
|---|---|---|
| Silica ($SiO_2$) | 48.4 | 52.5 |
| Alumina ($Al_2O_3$) | 34.7 | 42.0 |
| Titania ($TiO_2$) | 1.5 | 2.4 |
| Iron Oxide ($Fe_2O_3$) | 1.6 | 1.2 |
| Lime (CaO) | 0.4 | 0.3 |
| Magnesia (MgO) | 0.4 | 0.4 |
| Alkalies ($Na_2O + K_2O + Li_2O$) | 1.5 | 1.2 |
| Loss on Ignition | 11.4 | |

This invention may also be practiced by selecting an aggregate from the group comprised of calcined bauxite, dead burned magnesite, chrome ore, alumina, silica sand, fused silica, zirconia and zircon. All of these aggregates are "nonplastic" refractory materials or grogs. The terms "nonplastic refractory aggregates" "grog" have a well known meaning in the ceramic art, they define granular materials generally produced from dead burned or calcined refractories.

Operable practices according to this invention include aggregate crushed and sized to have the following screen analysis:

*Screen analysis (by weight)*

Held on 65 mesh _____ Up to 10%.
Pass 65 mesh held on 100 mesh _____
Pass 100 mesh held on 150 mesh _____
Pass 100 mesh held on 200 mesh _____ } By difference.
Pass 200 mesh held on 325 mesh _____
Passing 325 mesh _____ 40–90%.

Broadly, the mold wash, including the sized aggregate, is batched as follows:

*Batch (by weight)*

Pulverized Crude Fireclay
  (or functionally equivalent plastic refractory
  clay) _____ About 2 to about 10%.
Fermented Polysaccharide
  Gum _____ From 0.05 to about 0.2%.
Nonplastic Refractory Aggregate _____ By difference.

The following examples are offered, not by way of limitation, but to more clearly teach the invention to those skilled in the art.

Mold washes were prepared by adding various binders, dispersing agents and gums, as given in Table I, to a calcined fireclay aggregate. The aggregate was sized so that no more than 5% was held on 65 mesh and at least 55% passed 325 mesh. Sufficient water was added in order to bring the wash to a spraying or painting consistency. Two tests were then performed on the resulting mold washes. First, a sample of each of the mixes was placed in a 100 milliliter graduate to observe settling and gelling over an 8 hour period. Second, the mixes were sprayed onto a metal surface preheated to 500° F. The results of these tests are contained in the following table.

TABLE I

| | Examples | | | | |
|---|---|---|---|---|---|
| | I | II | III | IV | V |
| Batch (percent): | | | | | |
| Calcined Fireclay | 94.9 | 94.9 | 94.9 | 94.9 | 94.9 |
| Pulverized Crude Fireclay | 5.0 | 5.0 | 5.0 | 5.0 | 5.0 |
| Polysaccharide Gum (Fermented Type) | 0.1 | | | | |
| Algin Derivative Gum | | 0.1 | | | |
| CMC (Sodium Carboxymethyl Cellulose) | | | 0.1 | | |
| Hydroxypropyl Methyl Cellulose | | | | 0.1 | |
| Guar Gum | | | | | 0.1 |
| Water Added | 50 | 51 | 82 | 50 | 40.5 |
| Settling: | | | | | |
| After 1 hour | None | Excessive | Excessive | Excessive | Slight |
| After 8 hours | None | Excessive | Excessive | Excessive | Slight |
| Gelling: | | | | | |
| After 1 hour | None | Viscous | Viscous | Gelled | Gelled |
| After 8 hours | None | | | | |
| Sprayability: | | | | | |
| After 1 hour | Excellent | Poor | Poor | Poor | Poor |
| After 8 hours | Excellent | | | | |
| Adherence on Hot Metal Plate: (450–500° F.) | Excellent | (¹) | (¹) | (¹) | (¹) |

¹ Not tested because of gellation.

By "excessive" settling after 1 hour I mean there is more than one milliliter of clear liquid on the top of the 100 milliliter graduate. By "excessive" settling after 8 hours I mean there is more than 3 milliliters of clear liquid on top of the 100 milliliter graduate.

Examples I through IV demonstrate that certain water soluble polymers in the known class "polysaccharides" do not fulfill the requirements of this invention (see Example V). Nor do the cellulose derivative gums suffice (see Examples III and IV). Only the polysaccharide gums of the fermented type prevented settling and gelling of the mold washes.

Additional tests were run to determine the separate roles of the fermented polysaccharide gums and the pulverized crude clay. Examples VI and VII were prepared and tested in the same manner as Examples I through V reported in Table I. The batch compositions and the test results of these examples are given as follows:

TABLE II

| | Examples | | |
|---|---|---|---|
| | I¹ | VI | VII |
| Batch (percent): | | | |
| Calcined Fireclay | 94.9 | 95 | 99.9 |
| Pulverized Crude Clay | 5 | 5 | |
| Fermented Polysaccharide Gum | 0.1 | | 0.1 |
| Water Added | 50 | 31 | 60 |
| Settling: | | | |
| After 1 hour | None | Slight | None |
| After 8 hours | None | Excessive | Excessive |
| Gelling: | | | |
| After 1 hour | None | None | None |
| After 8 hours | None | None | None |

¹ Same as Table I.

A comparison of Examples I, VI, and VII establish that the pulverized crude clay or the polysaccharide gum of the fermented type, alone, do not provide the properties desired. It is the combination of the two which is the essence of my invention.

Examples VIII and IX, given in Table III, were prepared in the same manner as Examples I through VII. Table III establishes that the amount of polysaccharide gum of the fermented type added to the mix is critical. When used in excess of 0.2% the mix is viscous and contains lumps which do not dissolve. Such a viscous gel, and the lumps, would be detrimental to sprayability. The mold wash would clog the nozzle through which the wash is sprayed.

TABLE III

| | Examples | | |
|---|---|---|---|
| | I | VIII | IX |
| Batch (percent): | | | |
| Calcined Fireclay | 94.9 | 94.8 | 94.7 |
| Pulverized Crude Clay | 5.0 | 5.0 | 5.0 |
| Fermented Polysaccharide Gum | 0.1 | 0.2 | 0.3 |
| Water Added | 50 | 49 | 47 |
| Settling: | | | |
| After 1 hour | None | None | None |
| After 8 hours | None | None | None |
| Gelling: | | | |
| After 1 hour | None | Viscous | Viscous |
| After 8 hours | None | None | None |

All screen analyses are based on the Tyler standard screen scale.

Having thus described the invention in detail and with sufficient particularity, as to enable those skilled in the art to practice it, what I desire to have protected by Letters Patent, is set forth in the following claims:

I claim:

1. A method of coating nonpermeable metallurgical molds comprising the steps of: preparing a refractory mold wash by mixing a batch of materials consisting essentially of about 0.05 to 0.2%, by weight, of a Xanthomonas hydrophylic colloid prepared by the use of the bacterium *Xanthomonas campestris*, about 2 to 10%, by weight, of pulverized ground fireclay and the remainder nonplastic refractory aggregate sized so that no more than about 10% is held on about 65 mesh and about 40 to 90% passes 325 mesh, adding sufficient water to the batch to bring it to spraying consistency, and emplacing the wash on the walls of the metallurgical molds over a period as long as 8 hours after mixing.

2. The method according to claim 1 in which the nonplastic refractory aggregate is sized so that no more than about 5% is held on 65 mesh and no less than about 55% passes 325 mesh.

3. The method according to claim 1 in which about 0.1% Xanthomonas hydrophylic colloid is added to the batch.

4. The method according to claim 1 in which the amount of water added to the batch is about 50%.

References Cited

UNITED STATES PATENTS

| | | | |
|---|---|---|---|
| 3,110,944 | 11/1963 | Phelps | 106—38.22 |
| 3,146,113 | 8/1964 | Middleton et al. | 106—38.23 |
| 3,230,056 | 1/1966 | Arant | 106—38.22 X |
| 3,232,929 | 2/1966 | McNeeley et al. | 260—209 |
| 3,236,831 | 3/1966 | Schweiger | 260—209 |
| 3,243,397 | 3/1966 | Herkimer et al. | 106—38.22 |
| 3,251,768 | 5/1966 | Walker | 260—209 X |

ALEXANDER H. BRODMERKEL, *Primary Examiner.*

L. B. HAYES, *Assistant Examiner.*